Feb. 25, 1930. A. STOCKSTROM 1,748,854
SUPPORTING CARRIAGE FOR RANGE BROILING OVENS
Filed June 10, 1929 2 Sheets-Sheet 1
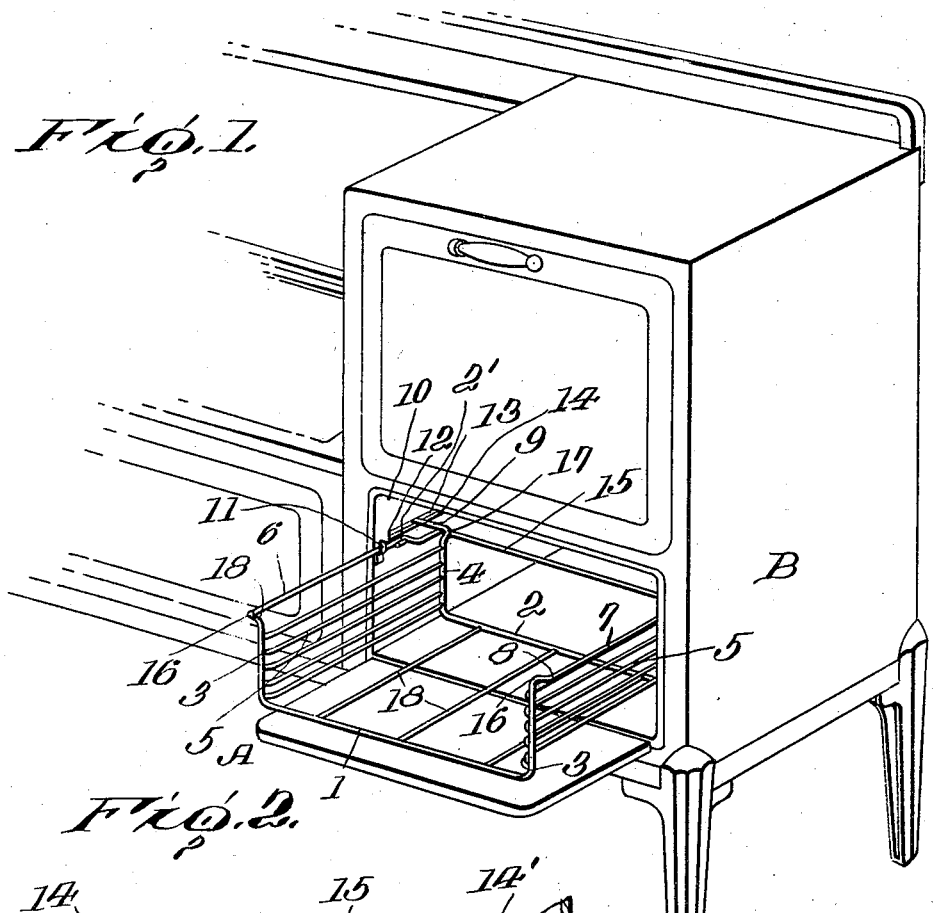
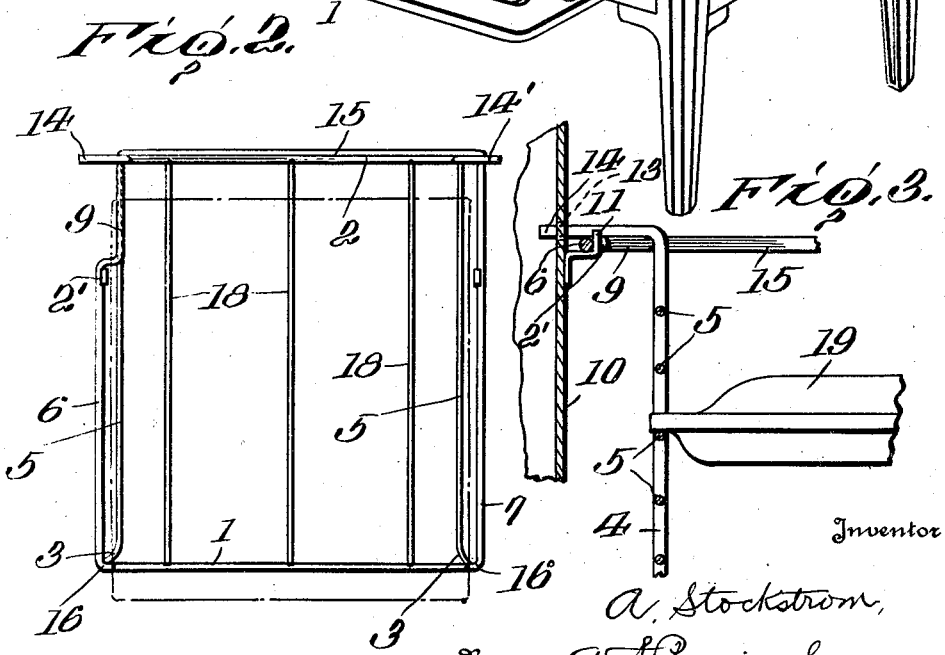

Feb. 25, 1930.  A. STOCKSTROM  1,748,854
SUPPORTING CARRIAGE FOR RANGE BROILING OVENS
Filed June 10, 1929  2 Sheets-Sheet 2
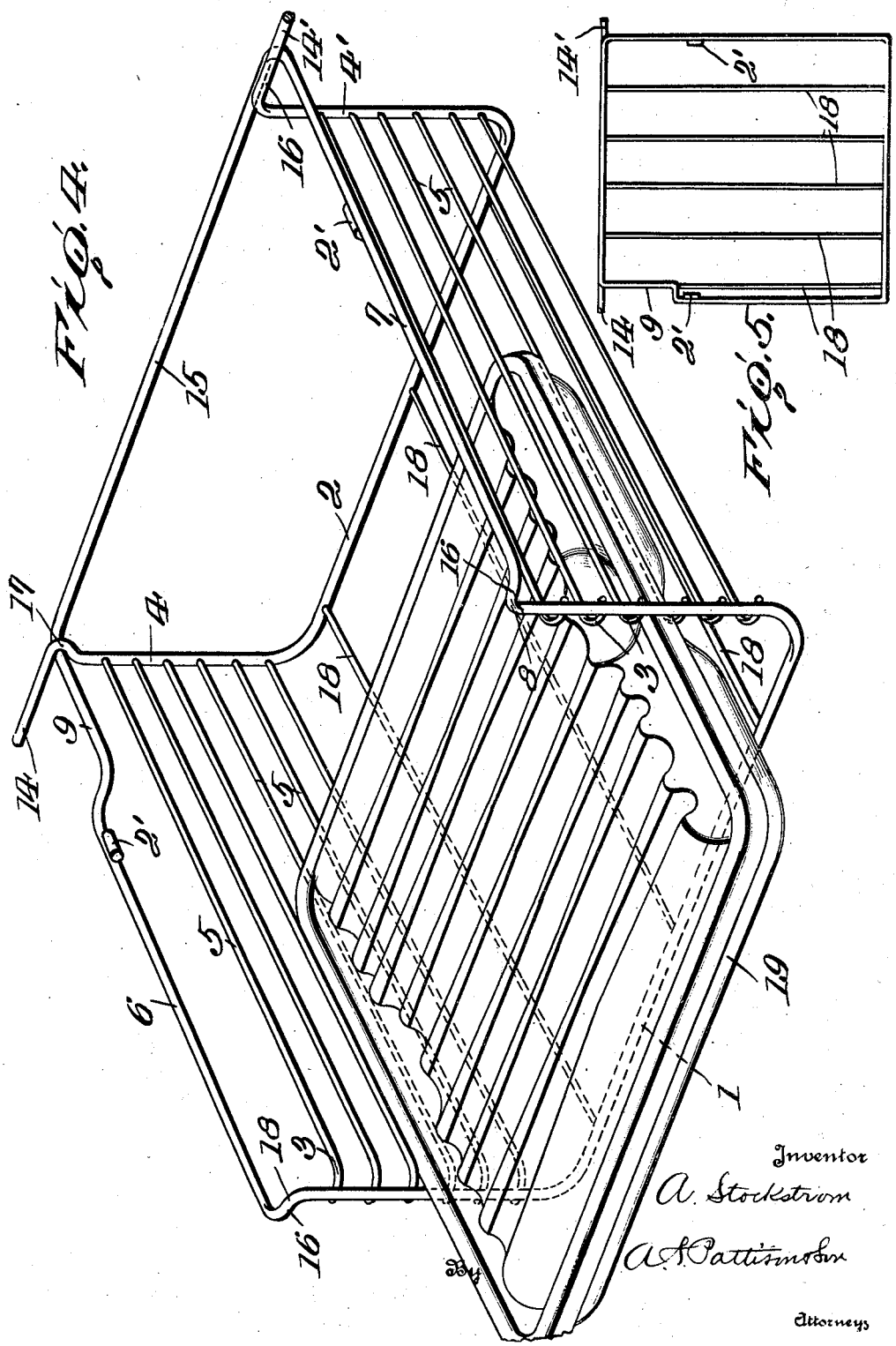

Patented Feb. 25, 1930

1,748,854

UNITED STATES PATENT OFFICE

ARTHUR STOCKSTROM, OF ST. LOUIS, MISSOURI, ASSIGNOR TO AMERICAN STOVE COMPANY, OF ST. LOUIS, MISSOURI, A CORPORATION OF NEW JERSEY

SUPPORTING CARRIAGE FOR RANGE BROILING OVENS

Application filed June 10, 1929. Serial No. 369,654.

This invention relates to improvements in supporting carriage for range broiling ovens and the primary idea of the present invention is to provide a supporting carriage for broiling ovens of gas and other ranges adapted to support a roasting and broiling pan or a shelf in the oven whereby the carriage can be readily drawn outward for exposing the object being cooked and at the same time can be quickly retracted in the oven.

The present device is shown applied to a broiling oven and it is especially designed for application to a broiling oven, but it will be understood that it can be used in connection with the baking oven above if it be desired to use it in that relation.

The primary object of the present invention is to construct a light carriage in which a broiling pan or shelf can be placed at various heights in the oven.

A further object of the invention is to construct the carriage of wire that is principally U-shaped in form and have the sides with a plurality of inwardly extending wires that receive either a roasting or broiling pan or a combined roasting and broiling pan or the usual wire or other shelf on which the object to be cooked is placed.

The invention further comprises a structure that is essentially U-shaped in form and the rear ends of the structure provided with laterally projecting rods, the rods adapted to enter slots formed in the lining of the oven, and to provide the front portion of the oven lining with lips on which the front part of the carriage rests whereby the carriage is supported in a manner that will make it easily moved inward or outward.

A further object of the invention is to provide the rear end of one side of the U-shaped carriage with an inwardly bent portion whereby when the carriage is in its outward position the projecting end of the rod at that side of the carriage can be caused to enter one longitudinal slot in the lining and then the carriage moved laterally sidewise to cause the other rod to enter the longitudinal slot in the opposite end of the oven lining, whereby when the carriage is moved inward it fits in the oven and holds the projecting ends of the wire in position as it is being moved inward or outward.

Further objects of the invention relate to certain details of construction which will appear from the following description.

In the drawings:

Figure 1 is a perspective view showing part of a range with its oven door open and the supporting carriage in position below the oven.

Figure 2 is a top plan view of the said carriage showing a broiling pan in dotted lines.

Figure 3 is a sectional view through one side of the broiling oven and showing one side of the carriage and one side of a combined broiling and baking pan in position on the carriage.

Figure 4 is an enlarged detached perspective view of the improved carriage showing a combined roasting and broiling pan supported thereon.

Figure 5 is a plan view showing a shelf or rack having the attachable and detachable feature applied thereto.

In Figure 1 of the accompanying drawings the carriage A is shown applied to the broiling oven B and with which it is especially designed to be used. This carriage is essentially U-shaped in front view. The U-shape consists essentially of a wire 1 for the front of the carriage and a wire 2 for the rear of the carriage both of the wires being bent in U-shape form. The vertical legs 3 of the wire 1 and the vertical legs 4 of the wire 2 are connected by wires 5. These wires extend longitudinal the carriage and have their ends connected with the vertical portions 3 and 4 of the wires 1 and 2. These ends are preferably spot welded though they may be otherwise connected. The longitudinal portions of the carriage 6 and 7 extend rearward and have their ends suitably connected with the upper ends of the rear U-shaped wire 4. In the form here shown the front ends 8 of the wires 6 and 7 are preferably integral with the wire 1 and the longitudinal portion 6 has its rear end bent lateral inward as at 9 and connected to the upper end of the wire 4 as previously stated. The longitudinal portion 7 extends inwardly or rearwardly in a straight line while the longitudinal portion 6 has its rear end inwardly bent as previously explained. The forward end of each of the vertical walls of the oven linings 10 are provided with upwardly extending ears 11 in which the longitudinal portions 6 and 7 fit, as clearly shown in Figure 3 while an ear or other stop member 12 is attached to the longitudinal portion 6 that strikes the ear 11, thus limiting the outward movement of the carriage.

Each of the linings 10 is provided with a longitudinal opening 13 into which the ends 14 and 14' of a cross bar 15 enter when the device is in position in the oven and ready for operation.

Attention is directed to the fact that the upper ends of the U-shaped wire 1 are each turned laterally outward as shown at 16 whereby the carriage is enlarged beyond the ends of the inwardly bent portions 3 with the exception of the upper end 17 of the vertical portion 4 of the U-shaped member 2.

As here shown, wires or bars 18 extend longitudinal the bottom of the carriage and they are separated a suitable distance apart and have their ends suitably connected with the wires 1 and 2. These wires 18 are for the purpose of strengthening the said carriage.

When the carriage is in the position shown in Figure 1 it is removable from the oven by being lifted sufficiently to permit the stop 12 to pass by the upper portion of the ear 11 when the laterally bent portion 9 permits the carriage to be moved laterally and the projection 14' removed from its slot and the carriage tilted to bring it outside of the oven to permit it to be moved laterally in the opposite direction for removing the end 14 from the slot 13. The carriage is placed in the oven by reversing the movements necessary for removing it from the oven as will be readily understood.

From Figure 4 it will be seen that the bar 15 is really a part of the longitudinal member 6 and that the end 14' is its extremity, while the upper end 4 of the bar 2 is doubled around the rear end of the inwardly extending portion 9 and suitably welded or otherwise connected to it. From the foregoing it will be seen that in forming the U-shaped part of the carriage it begins at the end 14' forming the cross bar 15, the laterally bent portion 9 and the longitudinal portion 6 extends and forms the U-shaped portion 1 and then passes up forming the longitudinal portion 7, the outwardly bent portion 16, and then forms the U-shaped portion 2 which ends finally in the extended end portion 14. From this it will be observed that the whole U-shaped part of the carriage is formed from an integral bent wire. Attention is also directed to the fact that this U-shaped frame is made of heavier wire than are the longitudinal wires 5 which give strength to the carriage. This construction is the preferred construction but I desire it to be understood that this U-shaped carriage could be otherwise formed.

In Figure 4 I have shown a combined reversible roasting and baking pan 19, in one position the pan being used for roasting and in the other position for baking. However this combined roasting and baking pan forms no part of the present invention, the same being made the subject matter of separate applications now on file in the Patent Office. Also I wish it understood that instead of the form of roasting and baking pan any other form of pan can be used so long as it is made of a particular form to have its edges resting on any one of the bars 5. Furthermore this carriage is adapted to receive the ordinary wire or sheet shelf should it be desired.

The form of carriage here shown is broadly adapted to be applied to a broiling oven or to a baking oven that is provided with the ordinary plurality of runners (not shown) or extensions for supporting the usual shelves or pans, in which instance the longitudinal parts 6 and 7 will engage the uppermost runners. It will be observed in examining Figure 4 that the plurality of rods 5 have their rear ends straight and without the bends 3 at their front ends which makes the rod 2 at the rear of the carriage a smaller U-shape than is made by the rod 1. In case the carriage is to be used with the ordinary runners then the extensions 14 and 14' will be omitted or removed from the rear ends of the carriage. In fact the carriage can be used in an oven not having the slots 12 and the ears 11 and without the usual runners, and in that event the carriage would be supported by the rods 1 and 2 resting on the bottoms of the ovens.

However the invention specifically considered is of the construction previously described and operating as herein set forth whereby it is moved with the least possible friction, and being light is readily moved in and out as will be understood.

Various changes from the specific arrangement here shown can be made without varying from the present invention so long as the changes are not outside of a liberal interpretation of the appended claims.

I wish it also understood that the construction herein disclosed, whereby the carriage is adapted to be inserted and removed from the oven lining, can be applied directly to the rear end of a removable shelf or rack. By this it is meant that the shelf or rack would have substantially the inward bend 9 with the projecting ends 14 and 14' and the rack or shelf would be without the underlying U-shaped carriage. Therefore the present improvement is to broadly cover the construction for attaching and removing the device whether it be applied to a shelf or a rack or to the carriage for a rack or shelf. The idea is shown in Figure 5.

Having thus described my invention what I claim and desire to secure by Letters Patent is:

1. An oven carriage for the purpose specified comprising a front U-shaped member, a rear U-shaped member, a plurality of longitudinally extending separated members having their ends connected respectively with the front and rear U-shaped members, the upper ends of the U-shaped members connected by longitudinally extending members, one of said longitudinally extending members bent inwardly, and the upper ends of the rear U-shaped member having projecting members adapted to be engaged with longitudinal slots on the lining of the oven by moving the rear end of the carriage laterally.

2. An oven carriage composed of wire, the wire bent into a front U-shaped member and the upper ends of the U-shaped member bent laterally outward and then extending longitudinal of the carriage and extending transversely across the upper portion of the rear end of the carriage, and a rear U-shaped member having its upper ends connected with the transversely extending member, and a plurality of longitudinally extending members with their front and rear ends connected respectively with the front and rear U-shaped members of the carriage, the parts operating substantially as described.

3. An oven carriage composed wholly of wire, the frame of the carriage made of a single piece of wire beginning with a transversely extending member, one end of it bent and extending forwardly, then bent into a front U-shaped member, then extending longitudinally and then bent into a rear U-shaped member with its upper end connected with the transversely extending member, and a plurality of longitudinally extending separated members having their front and rear ends connected respectively with the front and rear U-shaped members, the front ends of the longitudinal members bent inwardly and adapted to receive therebetween the edges of a broiling pan and the like.

4. The combination with an oven having the side walls of the lining provided with longitudinal slots in their upper portions, of a carriage having a front U-shaped portion and a rear U-shaped portion, the said carriage having at its rear end oppositely extending projections entering the said slots, said carriage having longitudinally extending members connecting the upper ends of the U-shaped members and engaging the supports carried by the said oven lining, whereby the carriage is supported in the oven, substantially as described.

5. The combination with an oven having its side walls provided with longitudinal slots in their upper portions, of a carriage provided with longitudinally extending members adapted to receive a broiling pan and the like, said carriage essentially U-shaped in form, the rear portion of the carriage having extensions engaging said slots and the upper edge of the carriage supported by the side walls of the ovens, the parts operating for the purpose set forth.

6. The combination with the side walls of an oven having longitudinal slots in its upper portion, the slots having their outer ends closed, of a carriage esesntially U-shaped in form and having longitudinally extending members adapted to receive a broiling pan and the like, the upper ends of the U-shaped portion extending longitudinal the carriage and resting upon supports carried by the said walls of the oven, the upper ends of the supports open, one side of the rear end of the longitudinally extending portion curved inwardly and the rear end of the carriage provided with projections adapted to enter the said slots, whereby the carriage can be removed by lifting its front end out of said supports and moving laterally to disengage one of the projections from one of said slots and then moved in the opposite direction for disengaging the other projection from the said slot and whereby the carriage can be placed in the oven by reversing the above operation.

7. An oven carriage or rack having one of its inner corners inwardly removed and the rear of the rack provided with projections extending beyond the rack, said projections adapted to engage slots made in the vertical side walls of the oven and cooperating for attachment and detachment of the rack within the oven.

8. The combination of an oven having in its opposite vertical side walls longitudinal slots, of a carriage or rack having one of its rear corners cut out and its rear end provided with members oppositely projecting beyond the edge of the rack whereby the rack can be inserted and detached by pulling it outward and moving it laterally towards the cut out portion and then in the opposite direction, and attached by reversing the operation.

9. An oven carriage adapted to receive a broiling pan and the like, composed essentially of a front U-shaped member and a rear U-shaped member, said members connected by longitudinally extending separated members, and the upper ends of the U-shaped members provided with outwardly and longitudinally extending supporting members.

10. The combination with an oven of a carriage adapted to receive a broiling pan and the like, composed essentially of a front U-shaped member and a rear U-shaped member connected by longitudinally extending supports engaging members extending inwardly from the wall of the oven.

11. The combination with an oven of a carriage composed essentially of a front U- shaped member and a rear U-shaped member connected by longitudinally extending members adapted to receive a broiling pan and the like, longitudinally extending members connected with the upper ends of the U-shaped members, the front portion of the wall of the oven provided with inwardly extending supports for the second mentioned longitudinal members, the said oven wall having longitudinal slots and the ends of the rear U-shaped member projecting into the said slots, the parts operating as specified.

In testimony whereof I hereunto affix my signature.

ARTHUR STOCKSTROM.